United States Patent [19]
Schumacher

[11] 4,186,997
[45] Feb. 5, 1980

[54] OVERLAP TYPE WAVEGUIDE CONNECTOR ASSEMBLY AND METHOD

[75] Inventor: William L. Schumacher, Camp Hill, Pa.

[73] Assignee: AMP Incorporated, Harrisburg, Pa.

[21] Appl. No.: 768,512

[22] Filed: Feb. 14, 1977

[51] Int. Cl.$^2$ .................................................. G02B 5/14
[52] U.S. Cl. .................................................. 350/96.21
[58] Field of Search .................... 350/96 C; 339/91 R

[56] References Cited

U.S. PATENT DOCUMENTS

| | | | |
|---|---|---|---|
| 3,369,214 | 2/1968 | Krumreich et al. | 339/91 R |
| 3,734,594 | 5/1973 | Trambarulo | 350/96 C X |
| 3,963,323 | 6/1976 | Arnold | 350/96 C |
| 4,046,454 | 9/1977 | Pugh | 350/96 C |
| 4,047,797 | 9/1977 | Arnold et al. | 350/96 C |

OTHER PUBLICATIONS

Hawk, R. M., Thiel F. L., "Low-Loss Splicing and Connection of Optical Waveguide Cables", Proc. of the Society of Photo-Optical Instrumentation Engineers, Guided Optical Communications, vol. 63, Aug. 19–20, 1975, San Diego, Calif.

*Primary Examiner*—Rolf G. Hille
*Attorney, Agent, or Firm*—Gerald K. Kita

[57] ABSTRACT

The disclosure relates to a method and apparatus for connecting optical waveguides in coincident alignment, and features a connector divided into intermating sections, with each section having a fixture portion which is connected to an optical cable to provide a datum plane for precise waveguide positioning, and with each connector section further including a waveguide supporting portion in the form of an open box configuration latchingly receiving a corresponding fixture portion therein; and the open box configuration being provided with a projecting tongue portion provided with a pad of compliant material which laterally supports each waveguide in a corresponding fixture portion, the compliant material intimately encircling the waveguides upon intermating the connector sections and the compliant material further undergoing elastomeric deformation yieldably encircling the waveguides to align the waveguide central axes colinearly or coincidentally.

16 Claims, 14 Drawing Figures

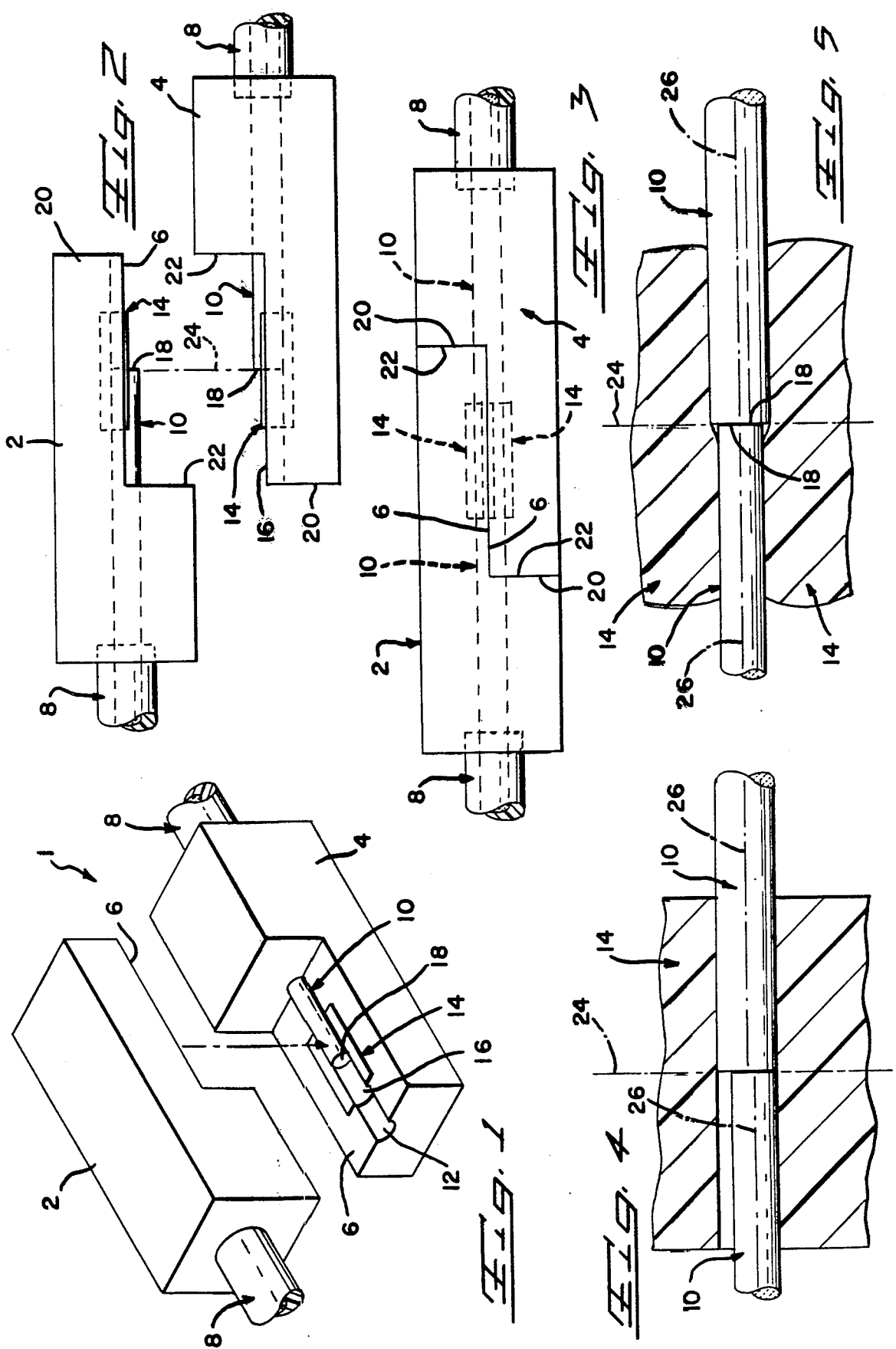

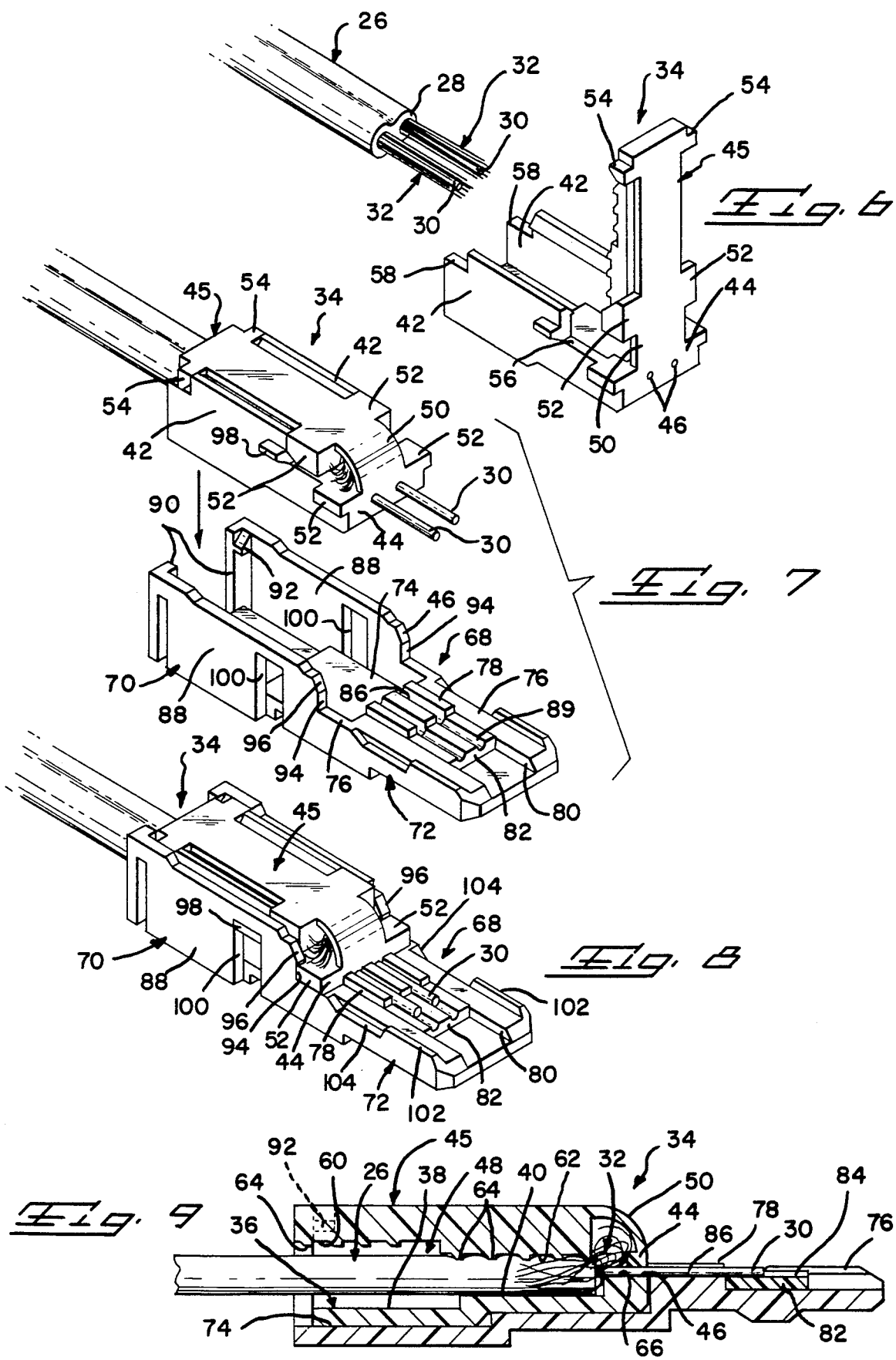

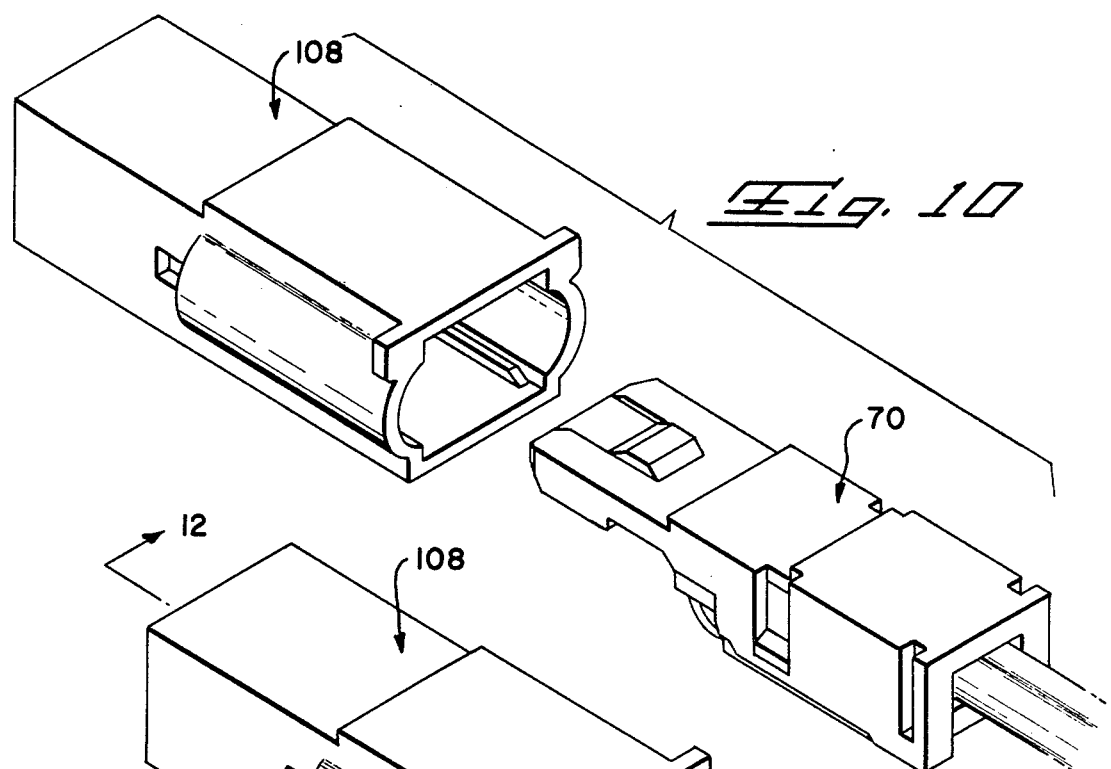
Fig. 10
Fig. 11
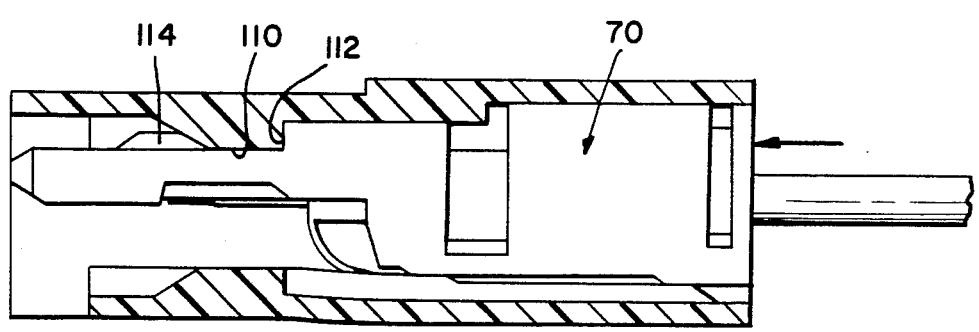
Fig. 12

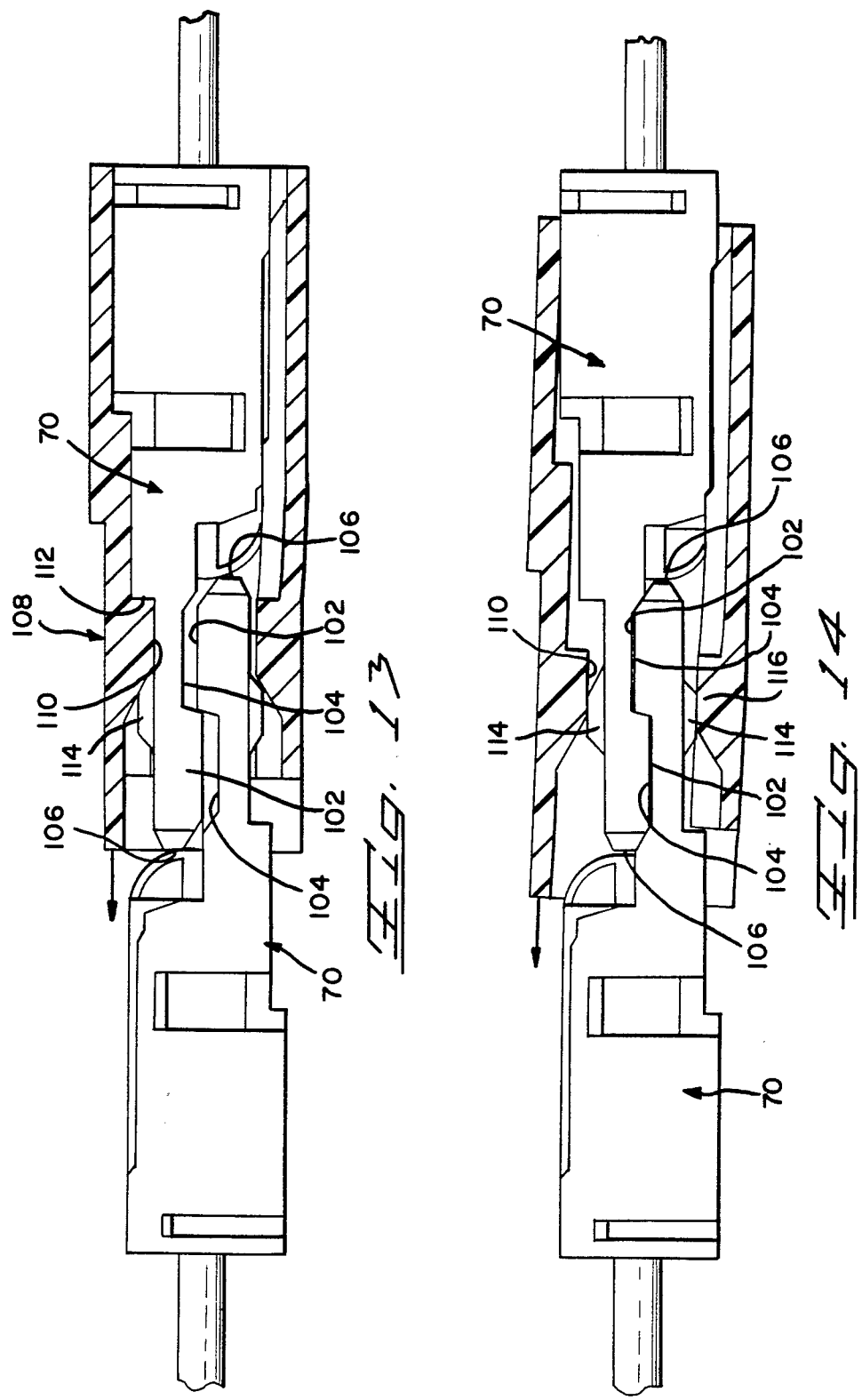

OVERLAP TYPE WAVEGUIDE CONNECTOR ASSEMBLY AND METHOD

BACKGROUND OF THE PRESENT INVENTION

Optical waveguides of the overlap type are well known in the prior art and are described more particularly in *Applied Optics*, Nov. 1976, Volume 15, No. 11, pp. 2785-2791. Such a connector as known in the prior art relies upon the connector material being of a single unit, and homogenous elastomer for small deformation to alow yieldable conformation of the connector material surrounding the waveguides. Should slight variations in the waveguide diameters occur due to allowable manufacturable tolerances the complaint deformation or yielding of the connector material will allow the axes of the waveguides of slightly different outside diameters to be coincident. However, the elastomeric properties of a material suitable for waveguide alignment is also unsuitable for maintaining precise connector dimensions. In the connector according to the present invention a combination of both elastomeric compliant material and rigid material suitable for maintaining precise dimensions is utilized.

Because precise dimensions are unattainable in an overlap connector of the prior art, special precaustions are required to prevent separation of the waveguide end faces. In a typical prior art overlap connector the waveguides to be joined are trimmed to excessive lengths. Then the waveguides are butted directly together and the excessive lengths of the waveguide are pushed back from the end faces of the abutting waveguides to be accumulated or otherwise taken up within the body of the connector. It has been found that abutting end faces produce undesirable abrasion and consequent attenuation in the light transferred between the waveguides. The connector according to the present invention utilizes a datum plane in each of the two intermating connector sections which allows precise positioning of the waveguides without permitting abutting and abrasion thereof.

BRIEF DESCRIPTION OF THE INVENTION

Each of the two intermating connector sections according to the present invention comprises a subassembly of two connector parts. A first part is a fixture for secured connection to an optical cable which contains one or more optical waveguides to be joined in the connector. The fixture provides a datum plane or surface from which is allowed to protrude a precise length of each optical waveguide. The fixture together with the corresponding waveguide or waveguides is then latchably secured to a second connector portion of each connector section. The datum plane of the fixture is positioned precisely against a mating surface assuring precise dimensional control and alignment of the waveguides in each connector section. Assembly of the fixture also permits careful placement of each protruding waveguide into a grooved track provided in the mating face. The grooved:'rack extends through a pad of elastomeric compliant material at each connector mating face and also through a nonyielding portion of the connector mating face which serves to protect and laterally support the length of each waveguide protruding from the corresponding fixture. When the connector sections are intermated the elastomeric compliant pads completely encircle the ends of the waveguides sealing them and allowing coincident alignment of the waveguide axes. The datum plane in each connector section assures coincident or colinear alignment of the waveguides as well as lateral and angular alignment thereof without abutting the waveguide end faces.

OBJECTS

It is an object of the present invention to provide an optical waveguide connector and a method for splicing optical waveguides such that the axes of two waveguides having the same or different outside diameters will be coincident or colinear and the waveguides will be aligned in both lateral and angular orientation without permitting abutment of the end faces of the waveguides.

Another object of the present invention is to provide an optical waveguide connector of the overlap type using nonresilient material for precise dimensional control, and compliant material in the form of pads at the overlapping mating faces of the connector, which pads encircle the peripheries of waveguides to be joined in the connector, and which pads undergo elastomeric deformation or yielding in response to slight tolerance differences in the waveguide diameters to align the central axes of the waveguides.

Another object of the present invention is to provide an optical waveguide connector of the overlap type with each intermating section fabricated in two parts, the first part being a fixture fixedly secured to an optical cable with the waveguide portion of the cable projecting from the fixture, and the second part of each intermating section receiving the fixture and positioning the protruding waveguide upon a compliant material at the overlap mating face.

Another object of the present invention is to provide an optical waveguide connector of the overlap type which positions a waveguide in a grooved compliant material located at the overlap mating face, and which provides grooved tracks through a rigid portion of the mating face to receive, support and protect the waveguide.

Another object of the present invention is to provide an optical waveguide connector having datum planes from which the waveguide ends protrude to desired lengths, and which datum planes abut each other and thereby guide the intermating sections of the connector into approximate alignment prior to mating the connector sections together.

Another object of the present invention is to provide an optical waveguide connector divided into a pair of intermating connector sections, with each section having a fixture provided with an apertured datum plane through which a precise length of optical waveguide projects, the datum plane further being mountable on a second component part of each connector section is carefully position the protruding waveguide at the overlap mating face of the second component, protecting the waveguide from damage within a grooved portion of the mating face.

Other objects and many attendant advantages of the invention will become apparent from a perusal of the following detailed description taken in conjunction with the accompanying drawings.

BRIEF DESCRIPTION OF THE DRAWINGS

FIGS. 1-5 are diagrammatic illustrations of a conceptual assembly method and connector for splicing optical waveguides.

FIG. 1 is a fragmentary perspective with illustrated connector sections in exploded configuration.

FIG. 2 is an enlarged fragmentary elevation of the connector shown in FIG. 1 with the connector sections in exploded configuration.

FIG. 3 is an enlarged fragmentary elevation illustrating the connector sections of the connector of FIG. 2 in intermated condition. FIG. 4 is an enlarged fragmentary elevation in section illustrating the orientation of waveguide mating faces supported in compliant pads immediately prior to intermating the connector sections.

FIG. 5 is a view similar to FIG. 4 illustrating elastomeric deformation of the pads which allows for coincident alignment of the waveguide axes.

FIGS. 6-9 together illustrate a specific form of waveguide overlap connector utilizing the techniques of the connector diagrammatically illustrated in FIGS. 1-5.

FIG. 6 is an enlarged fragmentary perspective of a fixture portion prior to mounting or securing of the same to a cable containing an exemplary pair of waveguides.

FIG. 7 is an enlarged fragmentary perspective with parts in exploded configuration illustrating the waveguides in FIG. 6 protruding from the fixture which is positioned for assembly in an open box configured connector part having a compliant pad and a grooved track portion of a connector mating face.

FIG. 8 illustrates the fixture assembled in the open box configured connector part with the protruding waveguides protected and supported in the grooved track portion of the mating face and with the end faces of the waveguides laterally supported in grooved tracks of the compliant pad.

FIG. 9 is an enlarged section taken along the line 9—9 of FIG. 8.

FIGS. 10, 11 and 12 illustrate a sleeve form clamping device holding a pair of connector sections in intermated condition.

FIG. 10 is an enlarged fragmentary perspective of the connector sections prior to assembly within the sleeve form clamping device.

FIG. 11 illustrates a complete assembly of the component parts shown in FIG. 10.

FIG. 12 is a longitudinal section taken along the line 12—12 of FIG. 11.

FIG. 13 is an enlarged fragmentary elevation in section illustrating a second intermating connector section inserted within the assembly shown in FIGS. 11 and 12.

FIG. 14 illustrates a sleeve form clamp retaining the connector sections shown in FIG. 13 in intermated condition.

DETAILED DESCRIPTION

With more particular reference to FIGS. 1-5 of the drawings, FIG. 1 more particularly illustrates at 1 an optical waveguide connector having an intermating pair of connector sections 2 and 4 with intermating faces 6. The connector 1 is of the overlap type with the mating faces 6 extending generally axially of the connector portions 2 and 4 instead of transversely thereto. The connector sections are secured in any well known manner such as by adhesive to corresponding optical cables 8. The axial direction of the connector is determined or defined by the orientation of corresponding waveguide cables 8 which contain one or more optical waveguides, an exemplary one of which is illustrated at 10. The axial or longitudinal orientation of a corresponding cable 8 determines the axial direction of the corresponding mating face 6. Each connector portion 2 or 4 is fabricated of a generally rigid material such that the mating faces 6 thereof are generally rigid surfaces provided with a grooved track 12 therein for each waveguide 10 to be received and supported therein. More specifically each waveguide 10 is at least partially recessed within a grooved track 12 of a mating face 6, the track side-supporting a length of a corresponding waveguide 10 and protecting the same from damage. Further as shown in FIG. 1 each mating face 6 has mounted therein a pad 14 of elastomerically compliant material, itself provided with a corresponding track 16 which side-supports a corresponding waveguide 10 immediately adjacent the transverse end face or mating face 18 thereof. As shown the mating face 18 of each corresponding waveguide 10 terminates at a transverse reference plane midway of the axial measurement of the pad.

As shown more particularly in FIG. 2 each connector portion 2 and 4 is provided with transverse end walls 20 and 22 extending in opposite directions from a corresponding mating face 6 and at opposite ends of the mating face 6. The pair of connector sections 2 and 4 are mated together in a transverse direction, with the end walls 20 being in registration with corresponding end walls 22 of an opposite connector section prior to mutual intermating engagement of the mating faces 6. Such interengagement between the walls 20 and 22 insures precise preliminary alignment of the waveguide end faces 18 on either side of a common transverse reference plane 24, such that when the connector section 2 and 4 are mated together, with the mating faces 6 thereof in mutual engagement as shown in FIG. 3, the end faces 18 will be brought into opposed alignment adjacent each other without permitting abutment or abrasion there between. The walls 20 and 22 thereby serve as datum planes from which end faces 18 are referenced by dimensions.

FIG. 5 illustrates the two ends of the waveguide 10 with the end faces 18 thereof with a minimized dimension separation there between on either side of the plane 24. As shown more particularly in FIGS. 2-5 the pads 14 initially project outwardly from the corresponding mating faces 6 prior to intermating the connector sections 2 and 4. As the connector sections are progressively intermated the compliant material of the pads 14 provides for coincident alignment of the waveguide axes. More particularly as shown in FIG. 4 as the connector sections 2 and 4 are progressively intermated the pads 14 will encircle both end portions of the waveguides 10 to be optically joined in end-to-end relationship. As shown the waveguides 10 are of slightly different diameters, such diameters being greatly exaggerated in their respective dimensions for the purpose of illustration. Such differences in diameter normally occur during manufacture of the waveguides. The central axes 26 of the corresponding waveguides 10 are initially misaligned as shown in FIG. 4 until, as shown in FIG. 5, the connector sections 2 and 4 are fully intermated. At that point the mating faces 6 are mutually engaged. The pads 14 also are mutually engaged and undergo elastomeric deformation or yielding to be disposed flush with a corresponding mating face 6. In addition FIG. 5 illustrates that elastomeric deformation or yielding further produces homogenous radial compression of the pads in complete encirclement over the peripheries of the waveguides 10 not only forming gland seals around the waveguides 10 but also forcibly orienting the waveguides 10 such that their axes 26 are coincident or colinear, further minimizing attenuation at the plane 24. Such alignment of the waveguides occurs without abrasion of the mating faces 18.

For a more specific embodiment of the connector according to the present invention reference will be made to FIG. 6. An optical cable 26 is illustrated and is typically of the type having a sheath 28 containing one or more, in this case, a pair of waveguides 30 which are generally encircled by a plurality of flexible strands 32 serving as tension reinforcement for the cable. In the connector each intermating connector sections is divided into two parts, a first part 34 is in the form of a fixture advantageously molded from a rigid dielectric material.

The fixture 34 comprises a multi-level or stepped-level tray surface 36 having a lower planar surface 38 and a stepped elevated planar surface portion 40. As shown in FIG. 9 the cable 26 overlies the stepped tray surface 36 and more particularly is laterally or side-supported against the surface portion 40. The fixture 34 is provided with projecting sidewalls 42 which are integral with and project upwardly from the tray surface 36. The sidewalls 42 laterally flank the cable 26 and thereby are properly aligned axially of the cable 26. An end wall 44 projects outwardly of the surface portion 40 and integrally joins the sidewalls 42. Apertures 46 are provided through the end wall 44 which freely admit therethrough corresponding waveguides 30.

As more particularly shown in FIGS. 7 and 9 the cable 26 is assembled to the fixture merely be inserting the waveguides 30 through the apertures 46 of the end wall 44, side-supporting the cable 26 in abutment against the stepped tray surface 36, and more particularly the surface portion 40 of the surface 36. The flexible fibers 32 will be diverted readily away from the waveguides 30 upon insertion thereof through the apertures 46. The fibers 32 thus will be retained between the sidewalls 42 and will become folded back upon engagement thereof with the end wall 44. The cavity defined by the side wall 42 and the end wall 44 and the tray surface 36 is then filled with a quantity of adhesive and filler material such as expoxy 48. A cover 45 is then closed to cover the cavity shown in FIG. 7. More particularly, the cover 45 is joined to the end wall 44 by a thin web 50 integral both with the cover and the end wall and forming thereby a flexibly yieldable hinge. Although desirably the fixture 34 is fabricated from a substantially rigid dielectric, the relatively thin web 50 is sufficiently thin to be resiliently yieldable when deformed over a radius of curvature, illustrated in FIGS. 7 and 9, sufficient to allow pivoting the cover 34 into a closed position.

As shown more particularly in FIGS. 6 and 7, the cover 45 is provided with a pair of integral laterally projecting arms 52 on a forward portion. The rearward portion of the cover 45 is provided with a second pair of integral laterally projecting arms 54. Each sidewall 42 is provided with a forward relieved or notched portion 56 and a rearward relieved or notched portion 58 which receive a projecting arm 52 and a projecting arm 54, respectively. The cover 45 shown in FIG. 7 thereby is suitably positioned over the fixture cavity in closed relationship, with a portion of each sidewall 42 being longitudinally wedged between corresponding arm portions 52 and 54.

As shown in FIG. 9 the cover 45 has a multilevel stepped under surface comprising a first level 60 and a second level 62, both of planar configuration and provided thereon with a projecting integral series of ribbed teeth 64. When the cover 45 is in a closed position the teeth 64 will engage the cable 26 gripping the same to prevent withdrawal thereof from left to right as shown in FIG. 9. The multi-level cover and the multi-level tray surface 36 cooperate to define a fixture cavity or receptacle for the cable having two distinct cavity portions of different volumes. As shown the smaller volume portion of the fixture cavity, defined by the tray surface portion 40 and the cover surface portion 62, is adequate to receive and support the cable 26 therein. If a larger width or larger diameter cable is to be utilized in the fixture, such can be supported in the larger volume cavity portion, defined by the tray surface portion 38 and the cover surface portion 60. Which ever size cable is to be utilized, however, the corresponding waveguide or waveguides yet are freely insertable through the apertures 46 in the end wall 44 which has a thickened portion 6 which laterally supports a length of bare waveguide 30.

The end wall 44 provides a datum plane which eliminates connector tolerance except for axial separation of waveguide ends. Each projecting waveguide 30 is then trimmed and polished or otherwise prepared according to established practices in the art to minimize attenuation of light transmitted therethrough. Each waveguide 30 is also trimmed to project a suitable length from the datum plane provided by the end wall 44.

FIGS. 7, 8 and 9 further illustrate a second part of each connector section or connector body in the form of a waveguide supporting portion generally indicated at 68. The waveguide supporting portion of each connector body or connector section is characterized by an open box configuration portion 70 and an integral projecting tongue portion 72. The open box configuration is provided with a stepped bottom surface 74 conforming to the outside surface of the fixture tray surface 36. The tongue portion 72 is provided with a planar surface 76 elevated with respect to the surface 74. The surface 76 provides a planar overlap mating face of each connector section. A rearward portion of the tongue portion 72, that portion immediately adjacent to the surface 74, is provided with a plurality of upstanding axial rigid ribs 78 projecting upwardly from the mating surface 76, providing rigid protection for the waveguides and preventing cross talk between adjacent waveguides. A forward portion of the tongue 72 is provided with a recessed channel 80 in which is disposed a pad 82 of elastomeric material such as a polyester elastomer, Hytrel, a registered trademark of E. I. DuPont deNemours & Company, Incorporated, Wilmington, Del. The pad 82 is provided with an elongate groove or grooves 84 corresponding to the number of waveguides to be supported therein. The ribs 78 define there between corresponding groove portions 86 in alignment with the grooves 84.

Returning now to the description of the open box configuration portion 70, such is provided with upstanding sidewalls 88. The rearward portions of which sidewalls terminate in short, intersecting corners 90 having projecting latches 92 projecting into the cavity receptacle defined between the sidewalls 88. Each sidewall 88 has a forward end portion 94 which terminates at the mating surface 76 in axially spaced relationship from the ribbed portions 78. The forward corner portions are chamfered at 96. The fixture portion 34 is adapted to be assembled to the connector portion 70 in a manner to be described in conjunction with FIGS. 7, 8 and 9. More particularly, it is important to note the fixture 34 is vertically inserted into the open box configuration 70, the arms 52 of the fixture 34 being slidably traversed over the chamfered corner portions 96 to place the arms 52 in registration within the space between the ribs 78 and the forward ends 94 of the sidewalls 88, as shown in FIG. 8. The latches 92 then register with and overlie the rearward notch portions 58 adjacent the arms 54 latching the rearward portion of the fixture within the confines of the sidewalls 88. Further, to latch the forward end of the fixture 34, the fixture is provided with a projecting latching tab 98 on each of the sidewalls 42, which tabs register respectively in inverted notches 100 provided in the sidewalls 88. The camming action of the chamfers 96 assure that the datum plane provided by the vertical end wall 44 is precisely in registration against the tongue portion 72. In addition, the vertical assembly of the fixture as described will insure that each of the corresponding waveguides 30 will be carefully laid in the groove portions 86 and the grooves 84 of the pad 82. Thus as shown in FIG. 8 the lengths of waveguide 30 which projects from the datum plane 44 will be carefully laid into and side-supported in the grooved pad 82 and in between the ribs 78. As shown in the figure the rigid ribs 78 are greater in vertical height then the diameters of the waveguides 30. The ribs thereby serve to deeply recess the waveguides providing rigid substantial side-support therefore and protection of the waveguides from damage. The datum plane 4 insures that the end faces of the waveguide 30 are precisely positioned axially with respect to the pad 82. When two connectors sections as shown in FIGS. 8 and 9 are mated together the waveguides 30 will be precisely positioned in end-to-end relationship without abutting the waveguide end faces. More particularly, a pair of connector sections, as described in conjunction with FIGS. 6-9, are assembled together such that the mating faces 76 are initially brought together into overlapped alignment. Then the mating faces are pressed into abutment with each other such that the ribs 78 of one connected section will interfit in the channel 80 of another connector section. The pads 82 of the connector sections will overlie each other on opposite sides of the waveguides 30. The pads 82 will yield elastomerically to compress in sealed abutment against each other and to sealably compress and encircle each of the waveguides 30, providing thereby surrounding elastomeric seals against light and atmospheric contamination. In addition the elastomeric sealing pads provide for coincident alignment of the waveguides axes at the waveguide end faces, without engagement, as described in conjunction with FIGS. 1-5.

As shown more particularly in FIG. 8 the forward portion of each tongue 72 is provided with a pair of vertical projections 102 on each side edge thereof. The rearward portion of each tongue 72 is provided with recessed portions 104 on each side edge thereof. The projections 102 of one connector section will engage the projection 102 of the other connector section, preventing mutual engagement of the connector mating faces before the waveguide ends are brought together into approximate alignment.

The extreme forward end 106 of each tongue portion will be immediately adjacent the datum plane end wall of the opposite connector section when the two connector sections are in approximate alignment as shown in FIG. 13. The projections 102 of one tongue portion 42 must overlie corresponding recesses 104 of the other tongue portion 42 prior to mating together the two connector sections.

In FIG. 14 the approximately aligned connector sections of FIG. 13 are shown mated together with the ends of the optical waveguides properly aligned.

FIGS. 10-14 illustrate a sleeve 108. A first connector section 70 is inserted in the right end of the sleeve 108 until an internal latch 110 registers between a shoulder 112 and a projection 114 on the connector section 70 as shown in FIG. 12.

Another connector section is inserted into the left end of the sleeve 108 as shown in FIG. 13. As shown in FIG. 14, the sleeve is slid over both connector sections 70 until the latch 110 is disengaged from the position shown in FIG. 13 to register compressibly in engagement on the projection 114. A like latch 116 on the sleeve interior registers in compressive engagement on a projection 114 on the other connector section 70. The projections 114 are directly opposite the overlap mating faces, and directly behind and over the pads 14. The compression of the latches 110 and 116 on the projections 114 apply compression on the pads 14 to sealably and compressibly surround the waveguide ends.

Although preferred embodiments of the present invention are illustrated and described in detail, other modifications and embodiments of the present invention will become apparent to one having ordinary skill in the art from the spirit and scope of the appended claims.

What is claimed is:
1. In an optical waveguide overlap connector, the improvement comprising:
   a pair of optical waveguides mounted in a pair of intermateable rigid connector bodies having identical mating faces which are provided with rigid grooves receiving therein said optical waveguides, said mating faces abuttingly cooperating to bring said grooves into mutual alignment enclosing said optical waveguides,
   pads of resilient compressible material initially projecting from mounted positions recessed within said mating faces, said pads being provided with grooves which are colinear with the rigid grooves of said mating faces and which initially receive therein corresponding end portions of said optical waveguides, and
   said pads being resiliently compressed together sealably surrounding said waveguide end portions upon cooperation of said mating faces, and said pads being yieldably compressed into enclosing relation with said end portions of said waveguides colinearally aligning the central axes thereof.

2. A method for connecting optical waveguides, in end to end alignment without engaging, comprising:
   placing optical cables containing said waveguides in closable fixtures,
   closing and securing said fixtures upon corresponding cables,
   trimming said waveguides to desired lengths protruding from datum planes of said fixtures,
   assembling and precisely positioning said fixtures in open box portions of intermating connector sections while simultaneously carefully laying said trimmed waveguides into grooved tracks provided in mating faces of said connector sections, and superposing the mating surfaces of said connector sections and thereby axially aligning said waveguide of one connector section with said waveguide of the other connector section.

3. The method as recited in claim 2, and further including the step of laying the trimmed waveguides in grooved elastomerically compliant pads located at said mating faces, and elastomerically deforming said pads in compliant engagement with each other, and compliantly encircling said trimmed waveguides with said pads, whereby said waveguide axes are coincidentally aligned.

4. In an overlap type connector body having a mating face laterally supporting an end portion of an optical waveguide by compliant material and being mateable by overlapping mating engagement against another mating surface of a connector body which laterally supports another optical waveguide, thereby to bring the end portions of both optical waveguides into mutual coincident alignment, the connector body characterized by:

a fixture portion having a section of compliant material, an insert portion having a datum surface, a waveguide secured on said insert portion with an end portion of said waveguide projecting outwardly from said datum surface a specified distance, said insert portion being mounted in said fixture portion and assembled thereto with the datum surface in a desired position on said fixture portion and with said waveguide end portion laterally supported in and immovable lengthwise along an elongated groove in said compliant material, said compliant material together with said groove therein extending beyond the terminal end of said waveguide, thereby providing for lateral support of another waveguide end portion in said groove in coincident and nonabutting end to end alignment with said first recited waveguide end portion.

5. The structure as recited in claim 4, wherein, said mating surface of said connector body includes a rigid recessed track in alignment with said groove, a section of said waveguide end portion being completely laterally recessed in said track.

6. In an overlap type connector for optic waveguides having first and second connector sections provided with mating faces which laterally support optic waveguides thereagainst, said connector sections overlapping each other with their mating faces opposed and in abutting cooperation to align the waveguides mutually end-to-end, each mating face having a projection which engages the other mating face to provide a standoff when said mating faces are improperly aligned as an incident prior to abutting cooperation, and each mating face being provided with recess means into which a projection of the other mating face is received once said mating faces are properly aligned as an incident to abutting cooperation, the improvement comprising:

a sleeve mounted initially over one said connector section and having a latch means disengageably registered on said connector section, said sleeve having an open end for receipt of another connector section therein, said sleeve being slidable with respect to said connector section to receive said another connector section in said open end and to shift said latch means disengageably from said connector section and into compression against another portion of said connector section thereby applying compression on the mating face of said connector section when in abutting cooperation with the mating face of said other connector section when said mating faces are properly aligned.

7. In an optical waveguide overlap connector for optical cables, each containing an optical waveguide, the improvement comprising:

a pair of intermateable and identical rigid connector bodies having mating faces which are provided with rigid grooves initially receiving therein corresponding optical waveguides, said mating faces abuttingly cooperating to bring said grooves into mutual alignment enclosing said optical waveguides, pads of resilient compressible material initially projecting from mounted positions recessed within said mating faces, said pads being provided with grooves which are colinear with the rigid grooves of said mating faces and which initially receive therein corresponding end portions of said optical waveguides, said pads being resiliently compressed together to sealably surround said waveguide end portions upon cooperation of said mating faces, said pads being yieldably compressed into enclosing relation with said waveguide end portions radially compressing said waveguide end portions to colinearly align the central axes thereof, each said connector bodies being in two parts, a first part being of open box construction provided at one end with a tongue provided with said mating face, a second part having a receptacle cavity receiving therein a corresponding said optical waveguide, a bottom wall of said receptacle cavity providing a registration stop for an optical cable containing a corresponding optical waveguide, said second part having a datum plane provided with an aperture to receive therethrough a corresponding said optical waveguide contained by said optical cable, and a corresponding said optical waveguide projecting outwardly a controlled distance from said datum plane and being received in said groove of said pad upon insertion and precise registration of said second part into the open box construction of said first part.

8. The structure as recited in claim 7, wherein, said second part includes a cover integrally joined to said bottom wall by a flexibly yieldable hinge, said cover having means therein for gripping said cable and retaining the same in registration against said bottom wall upon folding said hinge and allowing said cover to engage and overlay said cable, and latching means for latching said cover to said second part and in overlying relationship with said cable.

9. The structure as recited in claim 7, and further including: a sleeve encircling said pair of bodies when mated together, said sleeve having internal projecting surfaces engaging said tongues and pressing the same into mutual compressed engagement thereby resiliently compressing together said pads.

10. The structure as recited in claim 9, wherein said tongues include projecting portions therein which engage said projecting surfaces to apply compression directly over said pads.

11. The structure as recited in claim 7, wherein, said tongues include projecting ribs on either side of each groove provided in the mating surfaces, said ribs extending between said bottom walls and said pads shielding and protecting said optical waveguide in each groove.

12. A connector for colinearly aligning the central axes of optic waveguides in end to end relationship, comprising:

a pair of intermateable connector bodies each having a first section and a mating face extending from said first section, each mating face being identical with each other and a composite of a rigid portion and a resilient portion, each waveguide to be colinearly aligned being secured in a corresponding said first section and having a length laid laterally of its central axis within and along a continuous groove which extends through a corresponding said rigid portion and a corresponding said resilient portion, each said waveguide further having an end which terminates over a corresponding said resilient portion and along a corresponding said continuous groove, each said continuous groove being open along one side initially exposing said length of a corresponding said waveguide, first means for pressing said mating faces against each other with said continuous grooves in alignment and with said resilient portions engaging each other and yielding elastically to surround said waveguides and provide radial compression thereon to align the central axes of said waveguide ends, each rigid portion providing rigid substantial side support of each said waveguide, and second means on each said mating face interfitting with said rigid portion of the other mating face when said mating faces are pressed against each other.

13. The structure as recited in claim 12, wherein, each said connector body includes a receptacle part in which a corresponding said waveguide is secured, said receptacle part having a datum plane from which a corresponding said waveguide projects a precise distance, each said receptacle part and a corresponding said mating face being assembled and secured together so that said datum plane is in precise location with respect to said mating face and a corresponding said waveguide projects outwardly of said datum plane a precise distance along said continuous groove.

14. A pair of intermateable connector bodies for connecting the central axes of a pair of optical waveguides into coincident alignment, comprising:

each said connector body having a first portion including means for connecting a corresponding said waveguide thereto, each said first portion having a datum plane from which an end portion of a corresponding said waveguide projects a precise distance, each said connector body having a second portion including a mating face having a resilient portion provided with a continuous groove, said first and second portions of each said connector body being joined together with said datum plane in precise location with respect to said mating face and with said end portion of a corresponding said waveguide in registration laterally of its central axis on said resilient portion and along said continuous groove, and means for pressing said mating faces against each other with said grooves in lengthwise alignment with each other and with said resilient portions engaging each other and yielding elastically to surround said waveguide end portions and provide radial compression thereon to align the central axes thereof.

15. The structure as recited in claim 14, wherein, each said mating face includes a rigid portion between a corresponding said datum plane and a corresponding said resilient portion, said continuous groove projecting through a corresponding said rigid portion, and said rigid portion of each mating face providing side support for a corresponding said waveguide received along said continuous groove.

16. The structure as recited in claim 15, wherein, each said mating face includes means for interfitting with said rigid portion of the other mating face when said mating faces are pressed against each other.

* * * * *